(12) United States Patent
Best

(10) Patent No.: US 11,568,114 B2
(45) Date of Patent: Jan. 31, 2023

(54) ALL-DIGITAL CAMOUFLAGE CIRCUIT

(71) Applicant: Cryptography Research, Inc., San Jose, CA (US)

(72) Inventor: Scott C. Best, Palo Alto, CA (US)

(73) Assignee: Cryptography Research, Inc., San Jose, CA (US)

( * ) Notice: Subject to any disclaimer, the term of this patent is extended or adjusted under 35 U.S.C. 154(b) by 0 days.

(21) Appl. No.: 17/269,219

(22) PCT Filed: Aug. 15, 2019

(86) PCT No.: PCT/US2019/046631
§ 371 (c)(1),
(2) Date: Feb. 17, 2021

(87) PCT Pub. No.: WO2020/106339
PCT Pub. Date: May 28, 2020

(65) Prior Publication Data
US 2021/0342509 A1 Nov. 4, 2021

Related U.S. Application Data

(60) Provisional application No. 62/774,774, filed on Dec. 3, 2018, provisional application No. 62/720,067, filed on Aug. 20, 2018.

(51) Int. Cl.
*G06F 30/327* (2020.01)
*G06F 21/14* (2013.01)
*H03K 19/20* (2006.01)

(52) U.S. Cl.
CPC .......... *G06F 30/327* (2020.01); *G06F 21/14* (2013.01); *H03K 19/20* (2013.01)

(58) Field of Classification Search
CPC ........ G06F 30/327; G06F 30/30; G06F 30/32; G06F 30/35; G06F 30/3312; G06F 21/14; H03K 19/20

(Continued)

(56) References Cited

U.S. PATENT DOCUMENTS 6,825,698 B2 11/2004 Wang et al.
9,479,176 B1 10/2016 Eble, III et al.
(Continued)

FOREIGN PATENT DOCUMENTS

WO WO-2017-176381 A2 10/2017

OTHER PUBLICATIONS

Maria L. Mera Collantes et al., "Threshold-Dependent Camouflaged Cells to Secure Circuits Against Reverse Engineering Attacks", May 2, 2016 New York University.
(Continued)

*Primary Examiner* — Paul Dinh
(74) *Attorney, Agent, or Firm* — Lowenstein Sandler LLP

(57) ABSTRACT

Described are technologies of all-digital camouflage circuits. The camouflage circuit can include a first chain of inverters, synthesized with a first standard cell with a first transistor threshold, and a second chain of inverters, synthesized with a second standard cell with a second transistor threshold that is different than the first transistor threshold. A first flip-flop receives a first output of the first chain as a data input and a second output of the second chain as a clock input. A second flip-flop receives the second output as a data input and the first output of the first chain as a clock input. Given the different transistor thresholds, one flip-flop always outputs an active signal that corresponds to an input signal applied to the first chain and the second chain. The other flip-flop always output a constant signal, such an always low signal.

20 Claims, 7 Drawing Sheets

(58) Field of Classification Search
USPC .......................................................... 716/101
See application file for complete search history.

(56) References Cited

U.S. PATENT DOCUMENTS

| | | | |
|---|---|---|---|
| 2006/0248486 A1* | 11/2006 | Barnes | G06F 30/39 |
| | | | 716/113 |
| 2017/0110418 A1 | 4/2017 | Kuenemund et al. | |
| 2018/0247902 A1 | 8/2018 | Darmon et al. | |
| 2021/0280536 A1* | 9/2021 | Kuenemund | H01L 23/576 |

OTHER PUBLICATIONS

Notification Concerning Transmittal of International Preliminary Report on Patentability with dated Mar. 4, 2021 re: Int'l Apln. No. PCT/US2019/046631. 8 pages.

Notification of Transmittal of the International Search Report and the Written Opinion of the International Searching Authority, or the Declaration with dated May 15, 2020 re: Int'l Appln. No. PCT/US2019/046631. 9 Pages.

* cited by examiner

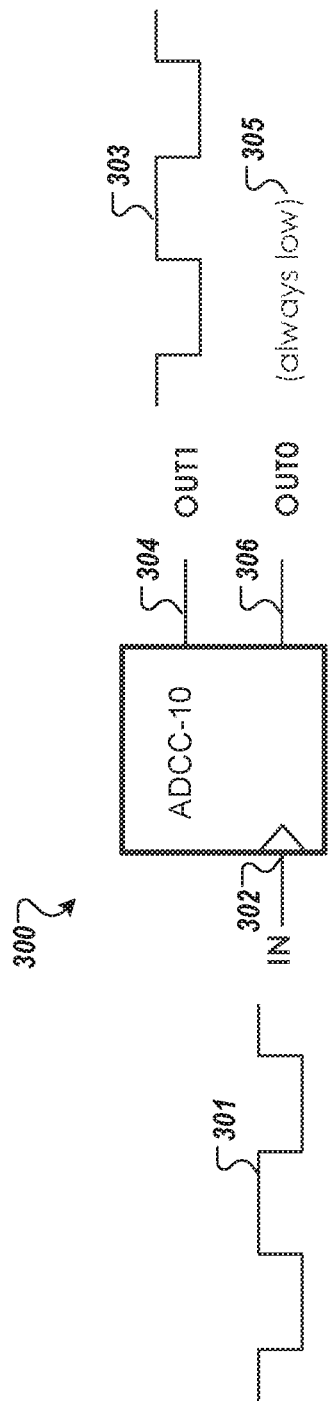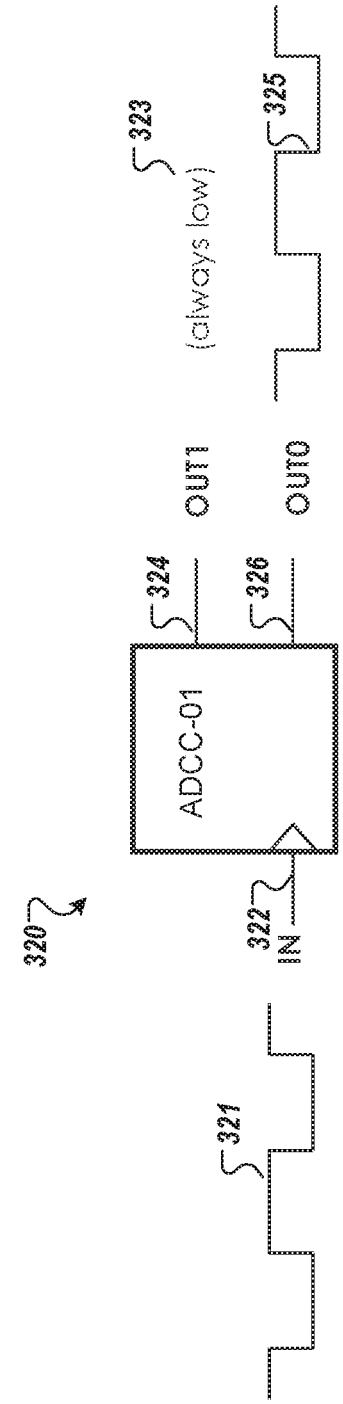
FIG. 3A
FIG. 3B

ALL-DIGITAL CAMOUFLAGE CIRCUIT

BACKGROUND

Camouflage circuits can be useful to delay the efforts of an adversary attempting to reverse-engineer a netlist from a semiconductor device. Reverse-engineering tools utilized to perform this reverse-engineering are effective in determining the logical functions of a gate, such as a NAND gate, a NOR gate, an AND gate, etc., because the on-chip geometry of those circuits are highly distinct from each other. Camouflage circuits attempt to confuse the reverse-engineering tools by implementing different logical functions in an optically-indistinguishable way, forcing the adversary to perform a more time-consuming electrical-probing effort to determine a circuit's function.

One drawback to conventional camouflage circuits is that they tend to be manually intensive and costly. When manufacturing a new circuit, the circuit needs to be built and characterized using a custom-circuit design flow, then modelled for a synthesis stage and then inserted into an original circuit design at a netlist stage, which is after the synthesis stage. Often, an engineer needs to modify the synthesized netlist to manually insert a sufficient number of conventional camouflage circuits. This manual process creates significant work and risk to insure that the conventional camouflage circuits are inserted in sufficient number without affecting intended functionality of the original circuit design.

BRIEF DESCRIPTION OF THE DRAWINGS

The present disclosure is illustrated by way of example, and not by way of limitation, in the figures of the accompanying drawings.

FIG. 3A is a block diagram of a non-inverting signal buffer made of the all-digital camouflage circuit according to one embodiment.

FIG. 3B is a block diagram of a non-inverting signal buffer made of the all-digital camouflage circuit according to another embodiment.

DETAILED DESCRIPTION

The embodiments described herein describe technologies of all-digital camouflage circuits. The all-digital camouflage circuits can be used to delay efforts of an adversary attempting to reverse-engineer a netlist from a semiconductor device. As described above, conventional camouflage circuits are inserted at the netlist stage after the synthesis stage, creating significant work and risk to be inserted into the original circuit design without affecting intended functionality. The embodiments of the all-digital camouflage circuits described herein can be inserted before the synthesis stage, reducing the amount of work and risk to insure that the all-digital camouflage circuits are inserted without affecting intended functionality of the original circuit design. The all-digital camouflage circuits described herein do not disrupt a normal synthesized register-transfer level (RTL) design flow.

The all-digital camouflage circuits, as described herein, take advantage of the fact that most standard cell libraries already include circuits which are optically indistinguishable, but slightly different in function. Namely, the library includes different threshold voltage options (also referred to as different transistor threshold options). For example, in a standard cell library, there are devices that are usually designated as regular threshold voltage (Vt) (RVT), high Vt (HVT), and low Vt (LVT). These different transistor threshold options of a device exist to optimize a design for both power and performance. For example, the HVT devices are slightly slower and lower-power than RVT devices, while LVT devices are slightly faster and higher-power than the RVT devices. The transistor-level processing adjustment, which assigns LVT, RVT or HVT options to a transistor, is subtle and difficult to detect in an automated way. In technical terms, the transistor-level processing adjustment is a relatively light and shallow doping of a channel surface region in a field effect transistor (FET). One all-digital camouflage circuit is described and illustrated in FIG. 1 as having two modes of operation, depending on the use of INT or HVT devices within the circuit.

Figure 1:
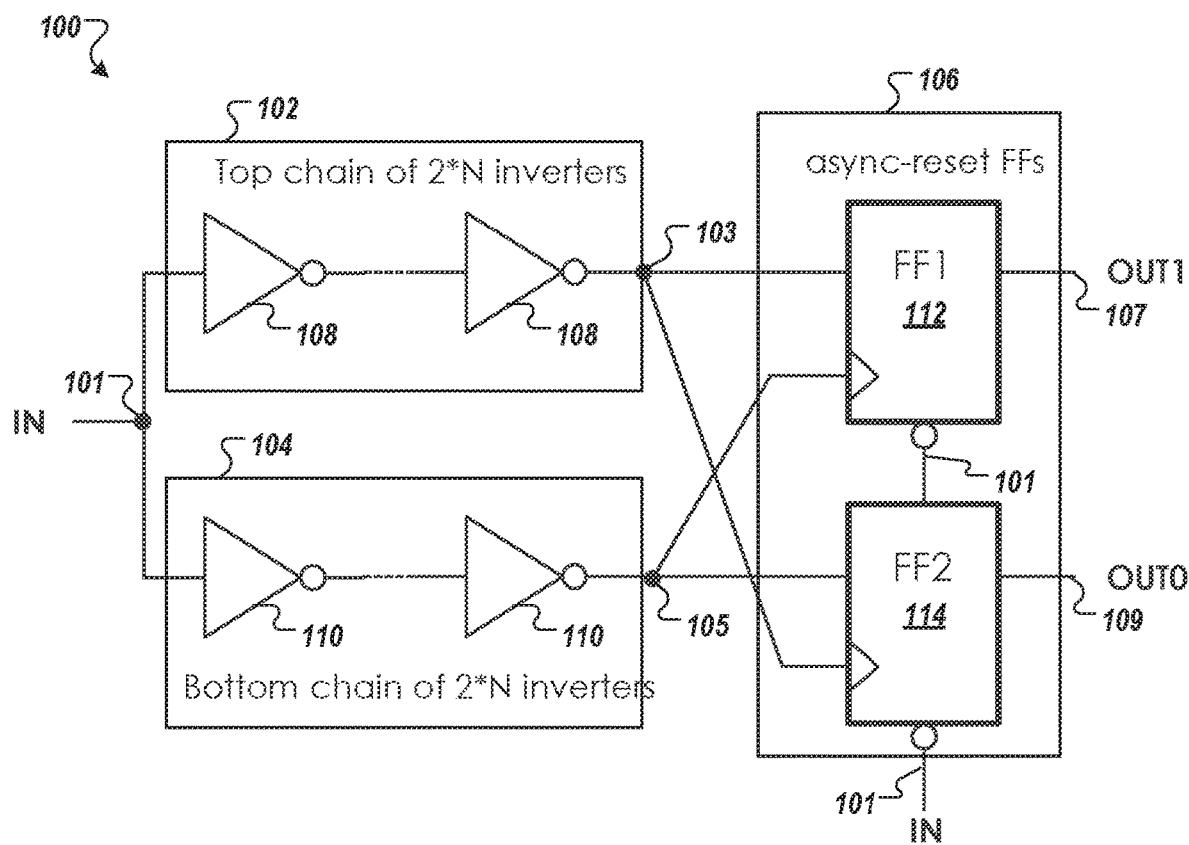
FIG. 1 is a schematic diagram of an all-digital camouflage circuit to generate an output dependent on a timing skew value caused by different transistor thresholds of standard cells of a standard library according to one embodiment.

FIG. 1 is a schematic diagram of an all-digital camouflage circuit 100 to generate an output dependent on a timing skew value caused by different transistor thresholds of standard cells of a standard library according to one embodiment. The all-digital camouflage circuit 100 includes two chains of multiple inverters, including a first inverter chain 102 and a second inverter chain 104, and two flip-flops, including a first flip-flip 112 and a second flip-flop 114. In one embodiment, the first inverter chain 102 includes an even number of inverters 108 (e.g., 2*N inverters, where N is a positive integer) and the second inverter chain 104 includes the same even number of inverters 108 (e.g., 2*N). The first inverter chain 102 receives an input signal 101 and generates a first output 103. The second inverter chain 104 receives the input signal 101 and generates a second output 105. The first flip-flop 112 includes a first data input to receive the first output 103 from the first inverter chain 102, a first clock input to receive the second output 105 from the second inverter chain 104, and a first data output to generate a first camouflage output signal 107. The first camouflage output signal 107 can be a first bit of an output sequence of bits from the all-digital camouflage circuit 100. The second flip-flop 114 includes a second data input to receive the second output 105 from the second inverter chain 104, a second clock input to receive the first output 103 from the first inverter chain 102, and a second data output to generate a second camouflage output signal 109. The second camouflage output signal 109 can be a second bit of an output sequence of bits from the all-digital camouflage circuit 100. The first camouflage output signal 107 may be a signal that corresponds to the input signal 101, whereas the second camouflage output signal 109 may always be in a steady state (e.g., always low or always high based on the convention of the all-digital camouflage circuit 100).

In one embodiment, the first inverter chain 102 is built using LVT inverters of a standard cell library and the second inverter chain 104 is built using HVT inverters of the standard cell library. For example, each inverter in the first inverter chain 102 is an inverter cell in the standard library cell with a low-voltage transistor threshold (LVT) option and each inverter of the second inverter chain 104 is the inverter cell with a high-voltage transistor threshold (HVT) option. As described earlier, the first inverter chain 102 built from LVT inverters will be slightly faster than the second inverter chain 104 built from HVT inverters despite the two circuit representations in silicon being visually indistinguishable. This very slight timing difference can be detected by using one chain output to sample the other, and vice-versa. For example, in the above circuit, when the input signal 101 (labeled "IN" signal) transitions from low to high, if the first inverter chain 102 is all LVT devices, the first data input ("D" input) on the first flip-flop will be fully transitioned when the slower second output signal 105 ("CLK" input) arrives from the second inverter chain 104, causing the first camouflage output signal 107 (OUT1 output) to transition from a low to high. The second flip-flop 114, on the other hand, will see a faster CLK signal, first output signal 103 from the first inverter chain 102, that arrives before the second data input ("D" input) transitions, causing the second camouflage output signal 109 (OUT0 output) to remain low. It should be noted that one of the inverter chains is intentionally and reliably slower than the other inverter chain, by an amount that can be reliably detected using simple logic circuits. This can be achieved using logic gates other than inverters (e.g., a delay chain using NAND gates would suffice) and it can be achieved using only one threshold option other than RVT. For example, in another embodiment, each inverter of the first inverter chain 102 is an inverter cell in the standard cell library with a regular-voltage transistor threshold (RVT) option and each inverter of the second invert chain 104 is the inverter cell with a high-voltage transistor threshold (HVT) option. In another embodiment, each inverter of the first inverter chain 102 is an inverter cell in the standard cell library with a regular-voltage transistor threshold (RVT) option and each inverter of the second inverter chain 104 is the inverter cell with a high-voltage transistor threshold (HVT) option. In another embodiment, each inverter of the first inverter chain 102 is an inverter cell in the standard cell library with a low-voltage transistor threshold (LVT) option and each inverter of the second inverter chain 104 is the inverter cell with a high-voltage transistor threshold (HVT) option.

In one embodiment, the first flip-flop 112 and the second flip-flop 114 are asynchronous-reset flip flops. The first flip-flop 112 can include a first clear input coupled to the input signal 101 and the second flip-flop 114 can include a second clear input coupled to the input signal 101. When the input signal 101 is received, the first flip-flop 112 and the second flip-flop 114 are cleared. As described above, one of the delay chains is intentionally and reliably slower than the other, by an amount that can be reliably detected using simple logic circuits. A D-type flip-flop is a reliable circuit element that can detect this difference, but other simple timing circuits other than a D-type flip-flop could be utilized as alternatives. For example, flip-flops come in other flavors such as SR, JK and T, and an alternative circuit could be built that achieves the same effect. Similarly, the D-type flip-flops shown in FIG. 1 could be replaced with a latch circuit (the difference being that the output of a D-type flop-flop is sensitive only to the rising edge of its clock signal, while a latch's output is sensitive to the logic level of its clock signal).

In one embodiment, as described above, the first inverter chain 102 includes an even number of inverters (e.g., 4, 6, 8 or the like). The number of inverters in the chain can be determined based on setup timing constraints of the flip-flops. As all of the circuits shown and described use the standard cell library elements as they are intended on being used, the all-digital camouflage circuit 100 is fully compatible with an all-digital, synthesized RTL design flow. The only risk to functionality is that the setup timing constraints of the two flip-flops must be insured. This can be done automatically by the synthesis tool, which can calculate a minimum number of "2*N" inverters in each chain such that the timing constraints of the flip-flops are reliably satisfied.

In another embodiment, the first inverter chain 102 includes an odd number of inverters 108 and the second inverter chain 104 includes the same odd number of inverters 110. In this embodiment, the input signal 101 is inverted at the first output signal 103 and the second output signal 105. The first flip-flop 112 and the second flip-flop 114 can be configured to receive the inverted output signals at the data and clock inputs. Some flip-flops in standard cell libraries have input ports for inverted and non-inverted signals, as well as output ports of both inverted and non-inverted types.

Although the all-digital camouflage circuit 100 includes the specific components as illustrated and described with respect to FIG. 1, in other embodiments, the all-digital camouflage circuit 100 includes a first circuit 102 with first logic gates to receive an input and to generate a first output; a second circuit 104 with second logic gates to receive the input and to generate a second output; and a third circuit 106 to receive the first output and the second output and to generate a third output dependent upon a timing skew value between the first output and the second output. The first logic gates are synthesized from first standard cells in a standard cell library and second logic gates are synthesized from first and second standard cells in the standard cell library. Each logic gate in the first logic gates has a significantly similar layout to each corresponding logic gate (e.g., inverter) in the second logic gates. The timing skew value results from the first standard cells having a different transistor threshold than the second standard cells. For example, the first standard cells have a first transistor threshold and the second standard cells have a second transistor threshold that is different than the first transistor threshold, in some cases, the standard cell library has logic gates having at least two transistor thresholds. In other cases, the standard cell library has logic gates with 3 or more different transistor thresholds.

Figure 4:
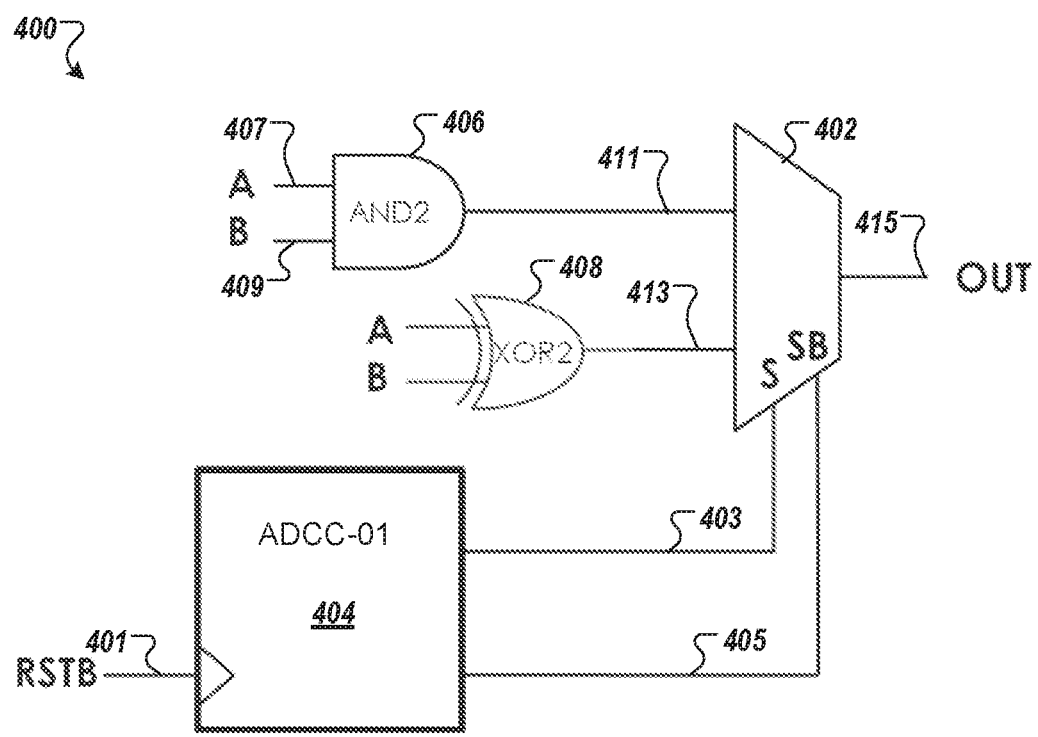
FIG. 4 is a block diagram of a circuit having a multiplexer and an all-digital camouflage circuit to select between two logic gates according to one embodiment.
Figure 5:
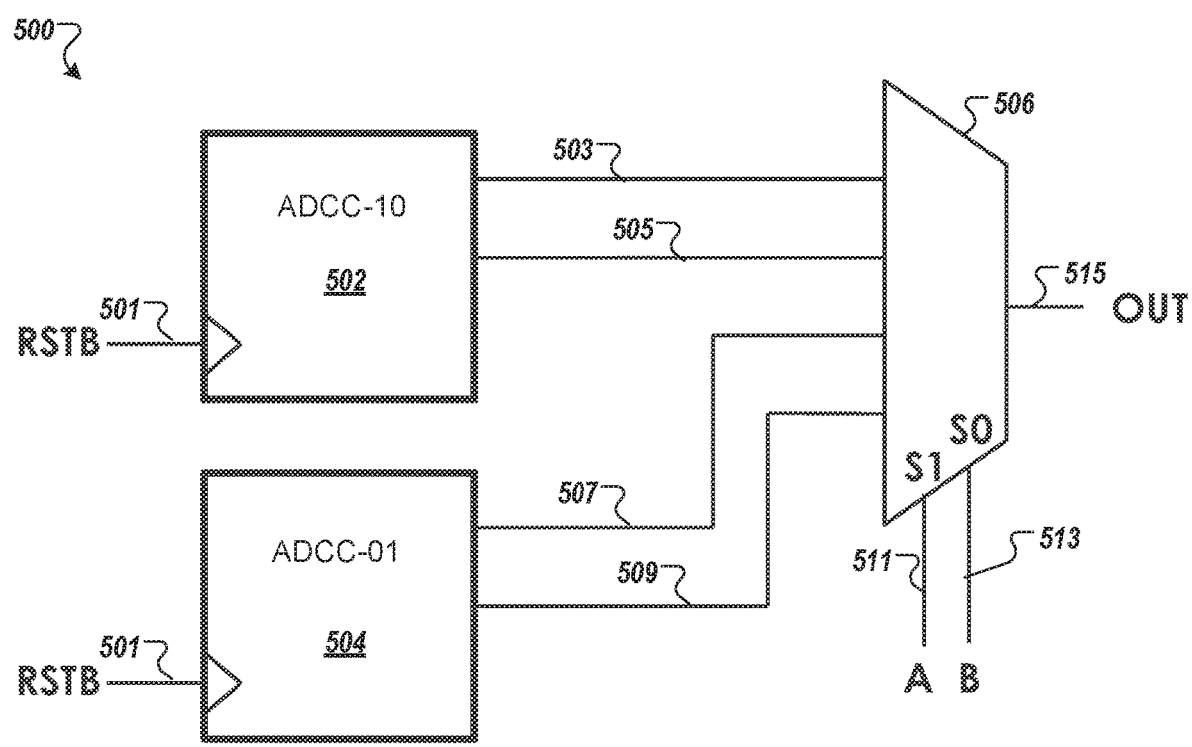
FIG. 5 is a block diagram of a circuit having a multiplexer and two all-digital camouflage circuits to select between two logical functions according to one embodiment.

The all-digital camouflage circuit 100 can be used as a non-inverting signal buffer, such as illustrated in FIG. 3A. In other embodiments, the all-digital camouflage circuit 100 can be used in connection with other circuits to select between different logic gates, such as illustrated in FIG. 4 or to select between different logic functions, such as illustrated in FIG. 5. The all-digital camouflage circuit 100 operates to camouflage the actual functionality of a circuit in which the all-digital camouflage circuit 100 is used.

Figure 2:
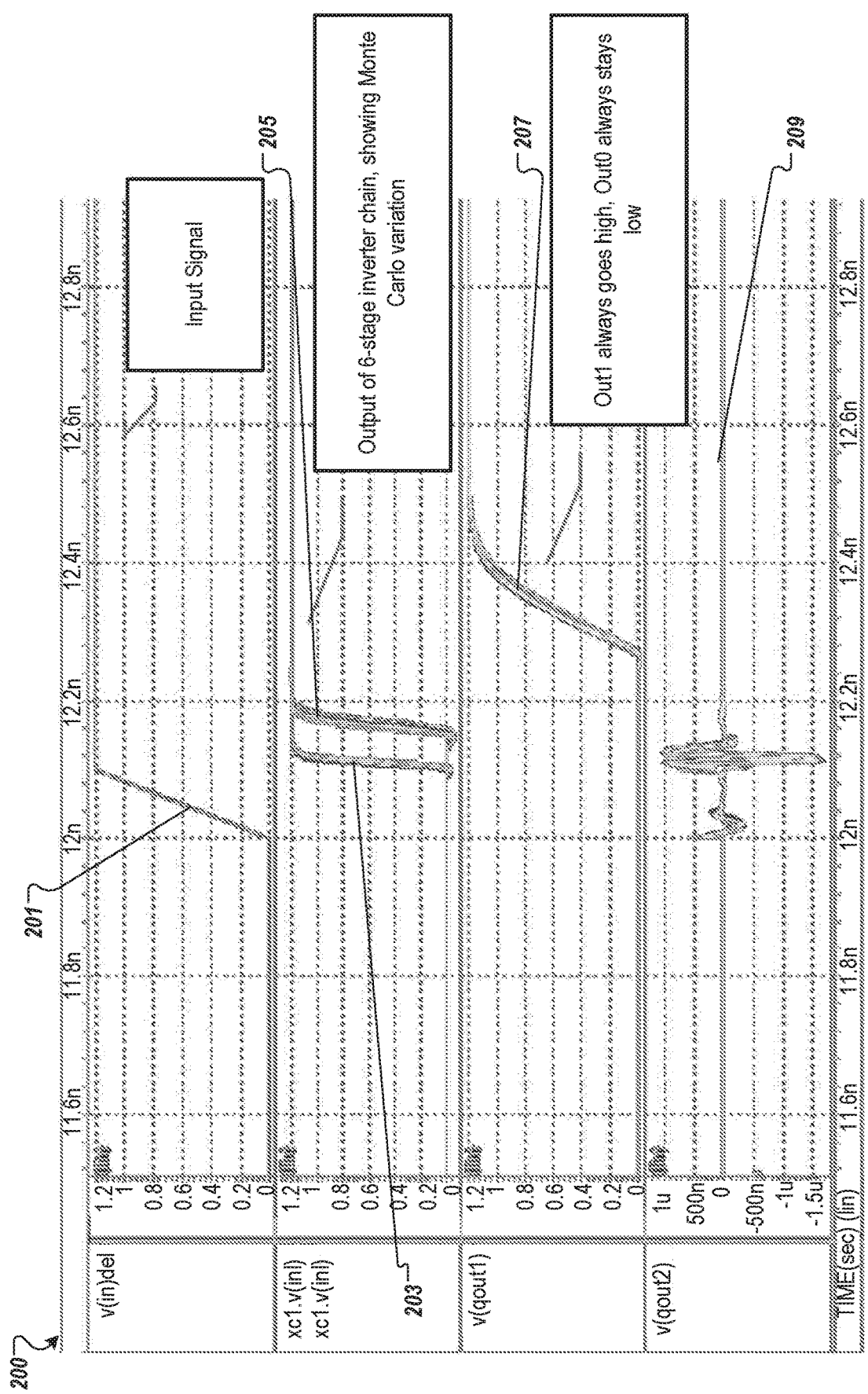
FIG. 2 is a graph illustrating a timing simulation of signals of an all-digital camouflage circuit according to one embodiment.

FIG. 2 is a graph 200 illustrating a timing simulation of signals of an all-digital camouflage circuit according to one embodiment. The all-digital camouflage circuit receives an input signal 201. A first set of logic gates of the all-digital camouflage circuit receive the input signal 201 and generates a first output signal 203. A second set of logic gates of the all-digital camouflage circuit receives the input signal 201 and generates a second output signal 205. A third circuit of the all-digital camouflage circuit receives the first output signal 203 and the second output signal 205 and generates two camouflage signals, including a first camouflage signal 207 that always goes high on a transition from low to high on the input signal 201 and a second camouflage signal 209 that remains low on the transition from low to high on the input signal 201. The output of the third circuit is dependent upon a timing skew value between the first output signal 203 and the second output signal 205. The first set of logic gates are synthesized from first standard cells in a standard cell library and second set of logic gates are synthesized from first and second standard cells in the standard cell library. Each logic gate in the first set of logic gates has a significantly similar layout to each corresponding logic gate in the second set of logic gates. The timing skew value results from the first standard cells having a different transistor threshold than the second standard cells. For example, the first standard cells have a first transistor threshold and the second standard cells have a second transistor threshold that is different than the first transistor threshold.

The first output signal 203 and the second output signal 205 are outputs of a 6-stage inverter chain and have been generated in an HSPICE simulation using a Monte Carlo variation to demonstrate that the first camouflage signal 207 always goes high, while the second camouflage signal 209 remains low as expected.

FIG. 3A is a block diagram of a non-inverting signal buffer 300 made of the all-digital camouflage circuit ("ADCC") according to one embodiment. The non-inverting signal buffer 300 can include the all-digital camouflage circuit 100 of FIG. 1. Alternatively, the non-inverting signal buffer 300 can include an all-digital camouflage circuit, including a first set of logic gates with a first transistor threshold, a second set of logic gates with a second transistor threshold, and a third circuit to output a first camouflage signal that corresponds to an input signal (always transitions high when the input signal transitions from low to high) and a second camouflage signal that remains in a same state (e.g., remains low).

During operation, the non-inverting signal buffer 300 receives an input signal 301 at a first input 302, such as a clock input. The non-inverting signal buffer 300 outputs a non-inverted signal 303, corresponding to the input signal 301, on a first output 304. The non-inverting signal buffer 300 also outputs a constant signal 305 (always low) on a second output 306. That is, a first output of the non-inverting signal buffer 300 is active and a second output of the non-inverting signal buffer 300 is always inactive. It can be said that the second output is deactivated, non-active, or in a constant state (always low). The first output signal 303 changes as activate transitions between a first state and a second state according to transitions of the input signal 301. In one embodiment, the output of the non-inverting signal buffer 300, when activated by the input signal 301, outputs two bits, including a first bit that is a 1 and a second bit is 0.

FIG. 3B is a block diagram of a non-inverting signal buffer 320 made of the all-digital camouflage circuit (ADCC) according to another embodiment. The non-inverting signal buffer 320 can be similar to the non-inverting signal buffer 300, except the third circuit outputs a first camouflage signal that remains in a same state (e.g., remains low) and a second camouflage signal corresponding to an input signal (always transitions high when the input signal transitions from low to high). This behavior would correspond, for example, if the top inverter chain 102 in FIG. 1 was built using slower HVT devices, while the bottom inverter chain 104 was built using faster LVT devices. Importantly, the functional difference between FIG. 3A and FIG. 3B cannot be determined using optical analysis only: the circuits within the ADCC block are optically indistinguishable from each other, an essential aspect of camouflage circuit technology.

During operation, the non-inverting signal buffer 320 receives an input signal 321 at a first input 322, such as a clock input. The non-inverting signal buffer 320 also outputs a constant signal 323 (always low) on a first output 324. The non-inverting signal buffer 320 outputs a non-inverted signal 325, corresponding to the input signal 321, on a second output 326. That is, a first output of the non-inverting signal buffer 320 is always inactive and a second output of the non-inverting signal buffer 320 is active. That is, the second output signal 325 changes as activate transitions between a first state and a second state according to transitions of the input signal 321. In one embodiment, the output of the non-inverting signal buffer 320, when activated by the input signal 321, outputs two bits, including a first bit that is a 0 and a second bit is 1.

Figure 3C:
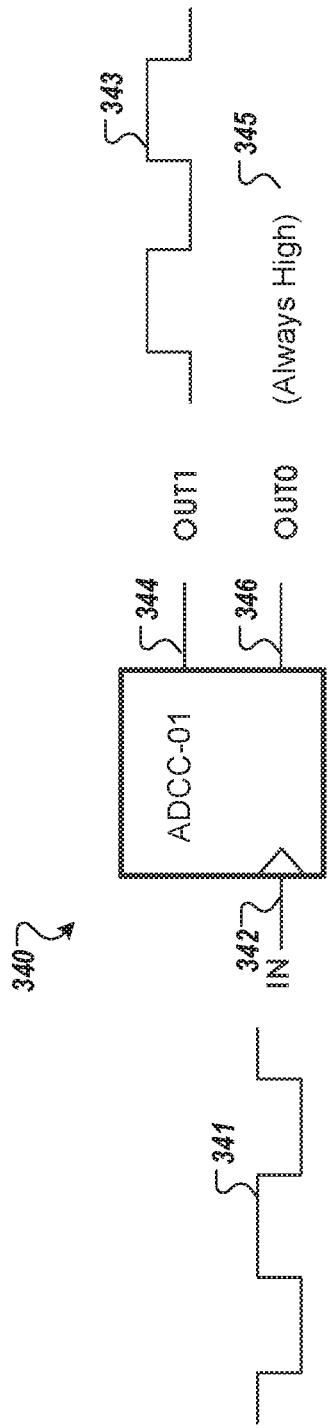
FIG. 3C is a block diagram of an inverting signal buffer made of the all-digital camouflage circuit according to one embodiment.

FIG. 3C is a block diagram of an inverting signal buffer 340 made of the all-digital camouflage circuit according to one embodiment. The inverting signal buffer 340 can include the all-digital camouflage circuit 100 of FIG. 1 except the output signals are inverted. In some cases, flip-flops can provide a non-inverted output signal, as well as an inverted output signal as part of the standard library cell. Alternatively, the inverting signal buffer 340 can include an all-digital camouflage circuit, including a first set of logic gates with a first transistor threshold, a second set of logic gates with a second transistor threshold, and a third circuit to output a first camouflage signal that corresponds to an input signal (always transitions high when the input signal transitions from high to low or always transition low the input signal transitions from low to high) and a second camouflage signal that remains in a same state (e.g., remains high or low).

During operation, the inverting signal buffer 340 receives an input signal 341 at a first input 342, such as a clock input. The inverting signal buffer 340 outputs a non-inverted signal 343, corresponding to the input signal 341, on a first output 344. The inverting signal buffer 340 also outputs a constant signal 345 (always high) on a second output 346. That is, a first output of the inverting signal buffer 340 is active and a second output of the inverting signal buffer 340 is always inactive. The first output signal 343 changes as activate transitions between a first state and a second state according to transitions of the input signal 341. In this case, in an inverted fashion. In one embodiment, the output of the inverting signal buffer 340, when activated by the input signal 341, outputs two bits, including a first bit that is a 0 and a second bit is 1.

Figure 3D:
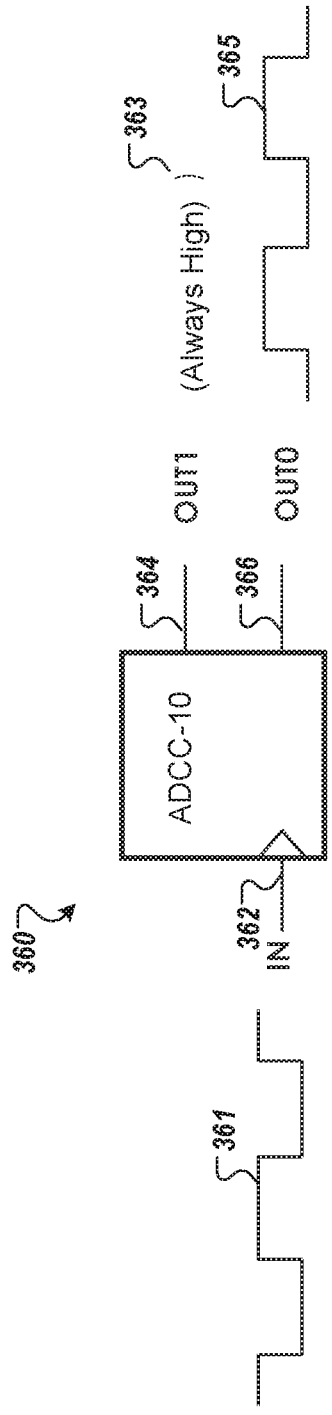
FIG. 3D is a block diagram of an inverting signal buffer made of the all-digital camouflage circuit according to another embodiment.

FIG. 3D is a block diagram of an inverting signal buffer 360 made of the all-digital camouflage circuit according to another embodiment. The inverting signal buffer 360 can be similar to the inverting signal buffer 340, except the third circuit outputs a first camouflage signal that remains in a same state (e.g., remains high) and a second camouflage signal corresponding to an input signal (always transitions high when the input signal transitions from high to low). Again, the functional distinction between the ADCC circuit shown in FIG. 3C and FIG. 3D cannot be determined using only optical analysis of the circuit.

During operation, the inverting signal buffer 360 receives an input signal 361 at a first input 362, such as a clock input. The inverting signal buffer 360 also outputs a constant signal 363 (always high) on a first output 364. The inverting signal buffer 360 outputs an inverted signal 365, corresponding to the input signal 361, on a second output 366. That is, a first output of the inverting signal buffer 360 is always inactive and a second output of the inverting signal buffer 360 is active. That is, the second output signal 365 changes as activate transitions between a first state and a second state according to transitions of the input signal 361. In this case, the transitions are inverted from one another. In one embodiment, the output of the inverting signal buffer 360, when activated by the input signal 361, outputs two bits, including a first bit that is a 1 and a second bit is 0.

FIG. 4 is a block diagram of a circuit 400 having a multiplexer 402 and an all-digital camouflage circuit (ADCC) 404 to select between two logic gates 406, 408 according to one embodiment. The all-digital camouflage circuit 404 when it receives a reset signal (RSTB) 401, outputs signals 403, 405 to output the two bits of 01 to control the multiplexer 402. A first logic gate 406 is coupled to receive a first data signal 407 (A) and a second data signal 409 (B) and generates a first output data signal 411. A second logic gate 408 is coupled to receive the first data signal 407 (A) and the second data signal 409 (B) and generates a second output data signal 413. The multiplexer 402 is coupled to receive the first output data signal 411 from the first logic gate 4-6 and the second output data signal 413 from the second logic gate 408. The multiplexer 402 includes a first selection input coupled to a first output 403 of the all-digital camouflage circuit 404 and a second selection input coupled to a second output 405 of the all-digital camouflage circuit 404. In this embodiment, the first output 403 is inactive and the second output 405 is active. The multiplexer 402 selects the first output data signal 411 or the second output data signal 413 based on the first output 403 at the first selection input and the second output 405 at the second selection input and generates an output 415. In this case, the multiplexer 402 selects the second logic gate 408 as the second selection input is activated. That is, the output 415 is the second output data signal 413, Alternatively, the first output 403 can be coupled to the second selection input to select the first logic gate 406. Alternatively, an all-digital camouflage circuit that outputs 10 as the input can be used to select the first logic gate 406.

In one embodiment, as illustrated in FIG. 4, the first logic gate 406 is a two-input AND gate and the second logic gate 408 is a two-input XOR gate. Alternatively, the first logic gate 406 can include any logic gate having any number of inputs. Similarly, the second logic gate 408 can include any logic gate having any number of inputs. In this embodiment, it is the configuration of the ADCC 404 (e.g., which one of the two delay chains was configured to be faster than the other) which determines whether the AND gate or XOR gate path is active.

FIG. 5 is a block diagram of a circuit 500 having a multiplexer 506 and two all-digital camouflage circuits 502, 504 to select between two logical functions according to one embodiment. A first all-digital camouflage circuit 502, when it receives a reset signal (RSTB) 501, outputs signals 503, 505 to output the two bits of 10 as inputs to the multiplexer 506. A second all-digital camouflage circuit 504, when it receives the reset signal (RSTB) 501, outputs signals 507, 509 to output the two bits of 01 as inputs to the multiplexer 506. Thus, upon receiving the reset signal (RSTB) 501, the multiplexer 506 receives a bit sequence of 1001 on its inputs. The multiplexer 506 has a first selection input coupled to receive a first data signal 511 (A) and a second selection input coupled to receive a second data signal 513 (B). The multiplexer 506 is to generate an output data signal 515 based on the first data signal 511 (A) and the second data signal 513 (B), Based on the different combinations of the first data signal 511 (A) and the second data signal 513 (B), the output data signal 515 is a selection of a first logical function or a second logical function.

In one embodiment, as illustrated in FIG. 5, the multiplexer 506 selects between an XOR function and a XNOR function based on the two data input. In another embodiment, the multiplexer 506 includes more data inputs from more than two all-digital camouflage circuits. In other embodiments, the multiplexer 506 can include more control inputs to receive more than two data signals. Alternatively, the multiplexer 506 can be used to select between any two or more logical functions having any number of inputs.

As described above, the all-digital camouflage circuit generally includes: a first circuit having first logic gates to receive an input and to generate a first output; a second circuit with second logic gates to receive the input and to generate a second output; and a third circuit to receive the first output and the second output and generate a third output dependent upon a timing skew value between the first output and the second output. The first logic gates can be synthesized from first standard cells in a standard cell library and second logic gates can be synthesized from first and second standard cells in a the standard cell library. Each logic gate in the first logic gates can have a significantly similar layout to each corresponding logic gate in the second logic gates. The timing skew value results from the first standard cells having a different transistor threshold than the second standard cells.

In another embodiment, the first standard cells have a first transistor threshold and the second standard cells have a second transistor threshold that is different than the first transistor threshold. In one embodiment, the first transistor threshold corresponds to a RVT option, HVT option, INT option, or other designated transistor threshold options and the second transistor threshold corresponds to a different one of the RVT option, HVT option, LVT option, or other designated transistor threshold options available in the standard cell library. The standard cell library can have two or more transistor thresholds.

In one embodiment, the first circuit includes a first chain of inverters to receive the input and to generate the first output and the second circuit includes a second chain of inverters to receive the input and generate the second output. The first chain of inverters can have a lower transistor threshold than the second chain of inverters. Alternatively, the first chain of inverters can have a higher transistor threshold than the second chain of inverters. The first chain of inverters includes a specified number of inverters and the second chain of inverters has the same specified number of inverters. The specified number of inverters can be driven by a minimum setup time requirement of the third circuit. The specified number of inverters can be an even number of inverters. The third circuit can include a first flip-flop with a first data input to receive the first output from the first chain of inverters, a first clock input to receive the second output from the second chain of inverters, and a first data output to generate a first bit of the third output. The third circuit can further include a second flip-flop with a second data input to receive the second output from the second chain of inverters, a second clock input to receive the first output from the first chain of inverters, and a second data output to generate a second bit of the third output. The first flip-flop and the second flip-flop are asynchronous-reset flip-flops. The first flip-flop and the second flip-flop each include a clear input coupled to the input to clear the first flip-flop and the second flip-flop.

In one embodiment, the first circuit, the second circuit, and the third circuit are part of a non-inverting signal buffer, such as illustrated with respect to FIG. 3A. A first output of the non-inverting signal buffer is active and a second output of the non-inverting signal buffer is always inactive. In another embodiment, the first output of the non-inverting signal buffer is inactive and the second output of the non-inverting signal buffer is inactive. In one embodiment, the first circuit, the second circuit, and the third circuit are part of an inverting signal buffer, such as illustrated with respect to FIG. 3C. A first output of the inverting signal buffer is active and a second output of the inverting signal buffer is always inactive. In another embodiment, the first output of the inverting signal buffer is inactive and the second output of the inverting signal buffer is inactive.

In another embodiment, when two all-digital camouflage circuits are used, the second all-digital camouflage circuit includes: a fourth circuit with third logic gates to receive the reset signal and to generate a fourth output; a fifth circuit with fourth logic gates to receive the reset signal and to generate a fifth output; and a sixth circuit to receive the fourth output and the fifth output and generate a sixth output dependent upon a second timing skew value between the fourth output and the fifth output. The third logic gates can be synthesized from third standard cells in the standard cell library and fourth logic gates can be synthesized from fourth standard cells in the standard cell library. Each logic gate in the third logic gates has a significantly similar layout to each corresponding logic gate in the fourth logic gates. The second timing skew value results from the third standard cells having a different transistor threshold from the fourth standard cells. In some embodiments, the third logic gates are the same logic gates as the first logic gates and the fourth logic gates are the same logic gates as the second logic gates. Alternatively, the first, second, third, and fourth logic gates have different combination of different transistor thresholds.

Cryptographic systems need to camouflage circuitry used to implement a cryptographic function to protect keys or circuits used to generate a key or other sensitive information, such as functions for key generation, cryptographic challenges or the like. Given the sensitivity of the cryptographic functions, the all-digital camouflage circuits can be used in connection with other logic gates to camouflage the cryptographic functions, such as illustrated and described below with respect to FIG. 6.

Figure 6:
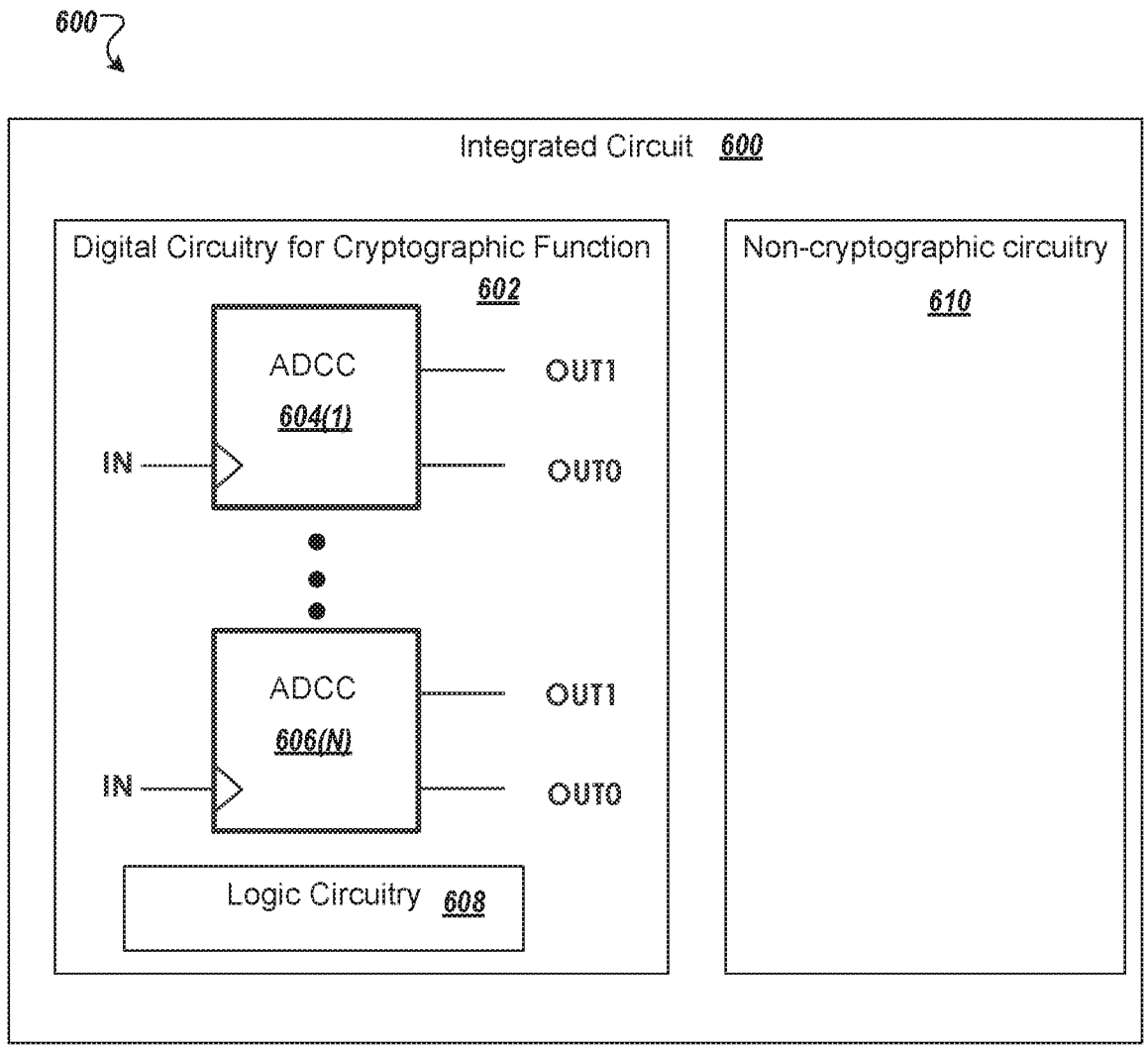
FIG. 6 is a block diagram of an integrated circuit having digital circuitry to implement a cryptographic function, the digital circuitry having at least one all-digital camouflage circuit according to one embodiment.

FIG. 6 is a block diagram of an integrated circuit 600 having digital circuitry 602 to implement a cryptographic function, the digital circuitry 602 having one or more all-digital camouflage circuits 604 according to one embodiment. The integrated circuit 600 includes the digital circuitry 602 that implements a cryptographic function. In a further embodiment, the integrated circuit 600 also includes other non-cryptographic circuitry 610. The digital circuitry 602 can include one or more all-digital camouflage circuits 604, such as illustrates 1-N camouflage circuits 604(1)-604(N), where N is a zero or a positive integer. The digital circuitry 602 also includes other logic circuitry 608. The all-digital camouflage circuits 604(1)-604(N) can be used in connection with logic gates to camouflage the cryptographic function being implemented by the logic circuitry 608, such as illustrated and described above with respect to FIG. 4. Alternatively, the all-digital camouflage circuits 604(1)-604(N) can be used to implement selection between multiple logical functions to camouflage the cryptographic function, such as illustrated and described above with respect to FIG. 5.

In one embodiment, a first all-digital camouflage circuit 604(1) includes a first chain of inverters to receive an input signal, the first chain of inverters being synthesized from a first standard cell in a standard cell library and the first standard cell having a first transistor threshold. The first all-digital camouflage circuit 604(1) includes a second chain of inverters to receive the input signal. The second chain of inverters is synthesized from a second standard cell in the standard cell library. The second chain of inverters has a same number of inverters as the first chain. The second standard cell is a same type of cell as the first standard cell and the second standard cell has a second transistor threshold that is higher than the first transistor threshold. The first all-digital camouflage circuit 604(1) includes a first flip-flop to receive a first output signal from the first chain of inverters and generate a first camouflage signal that corresponds to the input signal and a second flip-flop to receive a second output signal from the second chain of inverters and generate a second camouflage signal that remains in a same state. The first flip-flop is sampled by the second output signal and the second flip-flop is sampled by the first output signal. As described above, the first flip-flop is always sampled before the second flip-flop because the first chain has a lower transistor threshold than the second chain. That is, the output of the all-digital camouflage circuit 604(1) is dependent on a timing skew value caused by different transistor thresholds selected from the standard cells of the standard library.

In one embodiment, the logic circuitry 608 includes a first logic gate coupled to receive a first data signal and a second data signal and to generate a first output data signal and a second logic gate coupled to receive the first data signal and the second data signal and to generate a second output data signal. The logic circuitry 608 also includes a multiplexer coupled to receive the first output data signal from the first logic gate and the second output data signal from the second logic gate. The multiplexer includes a first selection input coupled to the first camouflage signal and a second selection input coupled to the second camouflage signal. The multiplexer selects the first output data signal or the second output data signal based on the first camouflage signal at the first selection input.

In another embodiment, the digital circuitry 602 further includes a second all-digital camouflage circuit 604(N) to generate a third camouflage signal and a fourth camouflage signal. The logic circuitry 608 includes a multiplexer coupled to receive, as data inputs, the first camouflage signal and the second camouflage signal from the first camouflage circuit 604(1) and the third camouflage signal and the fourth camouflage signal from the second all-digital camouflage circuit 604(N). The multiplexer includes a first control input coupled to receive a first data signal (A) and a second control input coupled to receive a second data signal (B). The multiplexer selects a first logical function (e.g., XOR) or a second logical function (e.g., XNOR) based on the data inputs, the first data signal, and the second data signal.

In further embodiments, more than two all-digital camouflage circuits 604 can be used to implement logic functions or used in connection with logic gates to implement the cryptographic function.

The embodiments described herein may be used for various cryptographic applications, such as seeds for cryptographic generation or key generation. The embodiments of the all-digital camouflage circuits can be built using ordinary VLSI circuits found in everyday standard-cell libraries. The embodiments described herein provide a fully synthesizable, camouflage circuit to be used in connection with other logic circuits without changing the underlying functionality of a circuit design, but camouflaging the circuit from optical and other reverse-engineering techniques. The circuits described herein are all digital circuits and can be built using standard-cell gates, can be auto placed and routed (P&R'd) without requiring hand-tuning and hand-layout, and can be tested using low-cost, all-digital manufacturing tests. The embodiments may have very fast startup time because there is no preconditioning of the circuit. As the circuit is all digital, the embodiments also consume very little standby power, limited only by the leakage current of the standard cell gates.

In the above description, numerous details are set forth. It will be apparent, however, to one of ordinary skill in the art having the benefit of this disclosure, that embodiments of the present disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypting," "decrypting," "storing," "providing," "deriving," "Obtaining," "receiving," "authenticating," "deleting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this disclosure, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this disclosure and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store the one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the embodiments of the present disclosure. Thus, the specific details set forth above are merely exemplary. Particular implementations may vary from these exemplary details and still be contemplated to be within the scope of the embodiments of the present disclosure.

It is to be understood that the above description is intended to be illustrative and not restrictive. Many other embodiments will be apparent to those of skill in the art upon reading and understanding the above description. The scope of the embodiments should, therefore, be determined with reference to the appended claims, along with the full scope of equivalents to which such claims are entitled.

While the details of the disclosure have been described with reference to specific embodiments thereof, it will be evident that various modifications and changes may be made thereto without departing from the broader spirit and scope of the embodiments of the present disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

What is claimed is:

1. An apparatus comprising:
a first circuit comprising first logic gates to receive an input and to generate a first output;
a second circuit comprising second logic gates to receive the input and to generate a second output; and
a third circuit to receive the first output and the second output and generate a third output dependent upon a timing skew value between the first output and the second output, wherein:
the first logic gates were synthesized from first standard cells in a standard cell library and second logic gates were synthesized from second standard cells in the standard cell library;
each logic gate in the first logic gates has a significantly similar layout to each corresponding logic gate in the second logic gates;
the timing skew value results from the first standard cells having a different transistor threshold than the second standard cells;
the third circuit comprises:
a first flip-flop comprising a first data input to receive the first output from the first circuit, a first clock input to receive the second output from the second circuit, and a first data output to generate a first bit of the third output; and
a second flip-flop comprising a second data input to receive the second output from the second circuit, a second clock input to receive the first output from the first circuit, and a second data output to generate a second bit of the third output.

2. The apparatus of claim 1, wherein the first standard cells have a first transistor threshold and the second standard cells have a second transistor threshold that is different than the first transistor threshold.

3. The apparatus of claim 1, wherein the standard cell library comprises logic gates having at least two transistor thresholds.

4. The apparatus of claim 1, wherein the first circuit comprises a first chain of inverters to receive the input and to generate the first output and the second circuit comprises a second chain of inverters to receive the input and generate the second output.

5. The apparatus of claim 1, wherein the first flip-flop further comprises a first clear input coupled to the input, and wherein the second flip-flop further comprises a second clear input coupled to the input.

6. The apparatus of claim 1, wherein the first flip-flop and the second flip-flop are asynchronous-reset flip-flops.

7. The apparatus of claim 4, wherein the first chain and the second chain have a same even number of inverters.

8. The apparatus of claim 1, wherein the first circuit, the second circuit, and the third circuit are part of a non-inverting signal buffer, wherein a first output of the non-inverting signal buffer is active and a second output of the non-inverting signal buffer is always inactive.

9. An apparatus comprising:
a first circuit comprising first logic gates to receive an input and to generate a first output;
a second circuit comprising second logic gates to receive the input and to generate a second output; and
a third circuit to receive the first output and the second output and generate a third output dependent upon a timing skew value between the first output and the second output;
a first logic gate coupled to receive a first data signal and a second data signal and to generate a first output data signal;
a second logic gate coupled to receive the first data signal and the second data signal and to generate a second output data signal; and
a multiplexer coupled to receive the first output data signal from the first logic gate and the second output data signal from the second logic gate, wherein the multiplexer comprises a first selection input coupled to the third output of the third circuit and a second selection input coupled to a fourth output of the third circuit, the fourth output being inactive, wherein the multiplexer is to select the first output data signal or the second output data signal based on the third output at the first selection input, wherein:
the first logic gates were synthesized from first standard cells in a standard cell library and second logic gates were synthesized from second standard cells in the standard cell library;
each logic gate in the first logic gates has a significantly similar layout to each corresponding logic gate in the second logic gates; and
the timing skew value results from the first standard cells having a different transistor threshold than the second standard cells.

10. An apparatus comprising:
a first circuit comprising first logic gates to receive an input and to generate a first output, wherein the first logic gates were synthesized from first standard cells in a standard cell library;
a second circuit comprising second logic gates to receive the input and to generate a second output, wherein second logic gates were synthesized from second standard cells in the standard cell library, wherein each logic gate in the first logic gates has a significantly similar layout to each corresponding logic gate in the second logic gates, wherein the timing skew value results from the first standard cells having a different transistor threshold than the second standard cells; and
a third circuit to receive the first output and the second output and generate a third output dependent upon a timing skew value between the first output and the second output, wherein the first circuit, the second circuit, and the third circuit are part of a first all-digital camouflage circuit to receive a reset signal and output a first bit in a first state and a second bit in a second state;
a second all-digital camouflage circuit to receive the reset signal and output a third bit in the second state and a fourth bit in the first state; and
a multiplexer coupled to receive the first bit, the second bit, the third bit, and the fourth bit, wherein the multiplexer comprises a first selection input coupled to receive a first data signal and a second selection input coupled to receive a second data signal, wherein the multiplexer is to generate an output data signal based on the first data signal and the second data signal.

11. The apparatus of claim 10, wherein the second all-digital camouflage circuit comprises:
a fourth circuit comprising third logic gates to receive the reset signal and to generate a fourth output;
a fifth circuit comprising fourth logic gates to receive the reset signal and to generate a fifth output; and
a sixth circuit to receive the fourth output and the fifth output and generate a sixth output dependent upon a second timing skew value between the fourth output and the fifth output, wherein:
the third logic gates were synthesized from third standard cells in the standard cell library and fourth logic gates were synthesized from fourth standard cells in the standard cell library;
each logic gate in the third logic gates has a significantly similar layout to each corresponding logic gate in the fourth logic gates; and
the second timing skew value results from the third standard cells having a different transistor threshold from the fourth standard cells.

12. The apparatus of claim 11, wherein the third logic gates have the same transistor thresholds as the first logic gates, wherein the fourth logic gates have the same transistor thresholds as the second logic gates.

13. A method comprising:
receiving, by a first circuit comprising first logic gates, an input, the first logic gates being synthesized from first standard cells in a standard cell library;
generating, by the first circuit, a first output;
receiving, by a second circuit comprising second logic gates, the input, the second logic gates being synthesized from second standard cells in the standard cell library, wherein each logic gate in the first logic gates has a significantly similar layout to each corresponding logic gate in the second logic gates;
generating, by the second circuit, a second output;
receiving, by a third circuit the first output at a first data input of a first flip-flop from the first circuit and the second output at a first clock input of the first flip-flop from the second circuit;
receiving, by the third circuit, the second output at a second data input of a second flip-flop from the second circuit and the first output at a second clock input of the second flip-flop from the first circuit
generating, by the third circuit, a third output dependent upon a timing skew value between the first output and the second output, wherein the timing skew value results from the first standard cells having a different transistor threshold than the second standard cells, wherein generating the third output comprises:
generating, at a first data output of the first flip-flop, a first bit of the third output; and
generating, at a second data output of the second flip-flop, a second bit of the third output.

14. The method of claim 13, wherein the first standard cells have a first transistor threshold and the second standard cells have a second transistor threshold that is different than the first transistor threshold.

15. The method of claim 13, wherein the standard cell library comprises logic gates having at least two transistor thresholds.

16. The method of claim 13, wherein:
receiving the input comprises receiving the input at a first chain of inverters;
generating the first output comprises generating the first output using the first chain of inverters; and
generating the second output comprises generating the second output using a second chain of inverters.

17. The method of claim 13, wherein the first flip-flop further comprises a first clear input coupled to the input, and wherein the second flip-flop further comprises a second clear input coupled to the input.

18. The method of claim 13, wherein the first flip-flop and the second flip-flop are asynchronous-reset flip-flops.

19. The method of claim 16, wherein the first chain and the second chain have a same even number of inverters.

20. The method of claim 13, wherein the first circuit, the second circuit, and the third circuit are part of a non-inverting signal buffer, wherein a first output of the non-inverting signal buffer is active and a second output of the non-inverting signal buffer is always inactive.

* * * * *